UNITED STATES PATENT OFFICE.

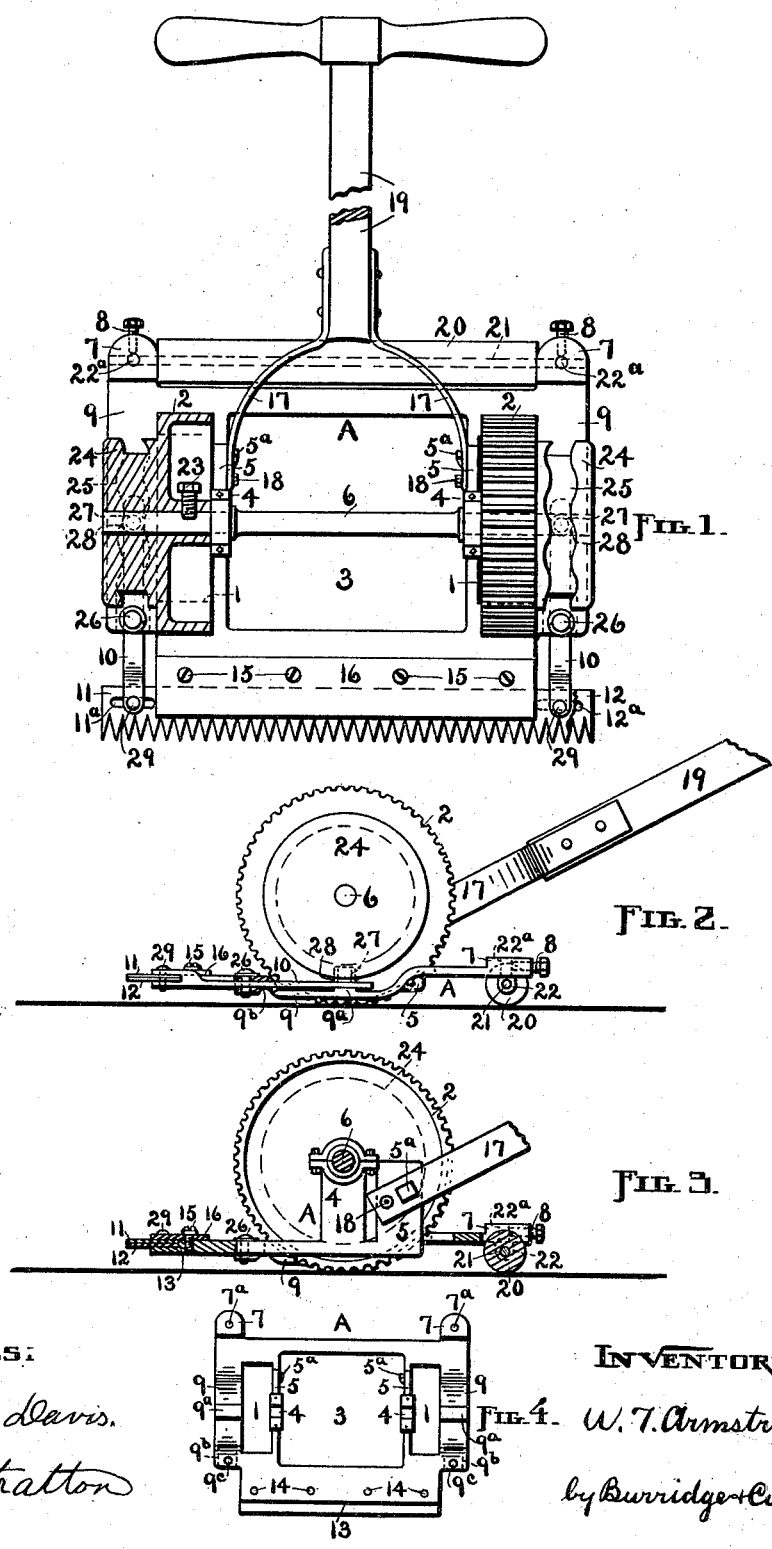

WILLIAM TELFER ARMSTRONG, OF CLEVELAND, OHIO.

LAWN-MOWER.

SPECIFICATION forming part of Letters Patent No. 534,775, dated February 26, 1895.

Application filed November 15, 1894. Serial No. 528,844. (No model.)

*To all whom it may concern:*

Be it known that I, WILLIAM TELFER ARMSTRONG, a citizen of the United States, residing at Cleveland, in the county of Cuyahoga and State of Ohio, have invented certain new and useful Improvements in Lawn-Mowers, of which the following is a full, clear, and exact description.

My invention relates to lawn mowers, but more particularly to that class of mowers which has laterally reciprocating cutters in front, and said invention consists of the several parts hereinafter fully set forth and described.
The object of my improvement is to provide a strong, durable and compact lawn mower capable of cutting grass of any height and in any locality, as around the edges of flowerbeds, near fences, &c. The cutters attached to my mower are operated automatically from the wheels which carry said mower.

That my invention may be seen and fully understood by those skilled in the art, reference will be had to the following specification and annexed drawings forming a part thereof, in which—

Figure 1 is a plan view of my machine in partial section; Fig. 2, a side view of said machine; Fig. 3, a transverse vertical section of the same, and Fig. 4, a reduced plan view of the frame.

Similar letters and figures of reference designate like parts in the drawings and specification.

The frame A, best shown in Fig. 4, has the openings 1, 1 to receive the lower portions of the wheels 2, 2. Between the central opening 3 in the frame A, and each of the openings 1 are the standards 4 and 5, the former serving as a bearing for the axle 6. The back end of the frame A is somewhat elevated above the main portion of said frame and terminates in the raised lugs 7, 7 having therein the vertical holes $7^a$, $7^a$ and threaded horizontal holes to receive the screw-bolts 8, 8, as indicated by dotted lines in Figs. 1, 2 and 3. The sides 9, 9 of the frame A, are depressed for the greater part of their length and each is provided with the central boss $9^a$. The forward ends of the sides 9 rise to a level with the main part of the frame A and are thickened vertically to leave room enough for the horizontal slots $9^b$, $9^b$ which receive the levers 10, 10. The forward ends of the sides 9 are also provided with the vertical holes $9^c$, $9^c$. The front end of the frame A serves as a carrier for the cutters 11 and 12, the back edges of which rest against the shoulder 13, and the threaded holes 14 are formed in the top of said front end to receive the screws 15 which hold the plate 16 in place over said cutters.

The exact shape or form of the frame A shown and described is not necessary to the success of my invention provided said frame is adapted to support the several parts in operative connection with each other, as hereinafter explained.

The standards 5, 5 have the lugs $5^a$, $5^a$ projecting from their adjacent sides, which are received into openings in the metallic bows 17, 17 and, with the screw bolts 18, 18, secure said bows to said standards. The handle 19 is made fast to the tops of the bows 17 and is similar to any ordinary lawn mower handle.

The roller 20 supports the rear end of the machine and has the axle 21 journaled in the bearings 22, 22, beneath the frame lugs 7. Each of the bearings 22 has the integral vertical stem $22^a$ fitted to the hole $7^a$ in the frame lug 7, and is adjustably secured therein by the bolt 8. By raising or lowering the roller 20, through the medium of its adjustable bearings 22, the cutters 11 and 12 are correspondingly raised or lowered.

The axle 6 is journaled to the tops of the standards 4 and each of the wheels 2 is secured to said axle by means of the set-screw 23, or in any other suitable manner. The peripheries of the wheels 2 are corrugated or milled, as is usual in such cases, to enable the same to "track" more firmly. The disks 24, 24 of less diameter than the wheels 2, are rigidly secured thereto or are integral therewith, as shown. Each disk 24 is provided with the circumferential cam-groove 25.
The levers 10 are fulcrumed to the forward ends of the frame sides 9 by the pins 26, 26 which pass through the holes $9^c$ and corresponding holes in said levers. The levers 10 work in the slots $9^b$. Projecting upward from the rear end of each lever 10, which extends beneath each disk 24 and rests upon the boss $9^a$, is the post 27. The two posts 27 are provided with the rolls 28, 28 which enter the cam-grooves 25 in the disks 24, and when said disks are revolved the levers 10 are vibrated sufficiently by means of said posts, rolls and grooves to reciprocate the cutters 11 and 12 the desired distance. The slots 9$^b$ in the sides 9, are wide enough to permit of the necessary motion or movement of the levers 10. The front ends of the levers 10 are bifurcated to receive the ends of the cutters 11 and 12. In one end of the cutter 11 is the slot 11$^a$ and in the opposite end of the cutter 12 is the slot 12$^a$. The bifurcated ends of the levers 10 are attached to the cutters 11 and 12 by the pins 29, 29. One of the pins 29 passes through the slot 11$^a$ and a hole below said slot in the cutter 12, and the other pin 29 passes through a hole in the cutter 11 and the slot 12$^a$. Hence it will be seen that a shearing reciprocating movement must be imparted to said cutters by the vibration of the levers 10. The plate 16 is secured to the frame A, as before described, and extends over the cutters 11 and 12 as far as their serrated edges, to form a way for said cutters to work in.

The operation of my machine is as follows:— Push the mower along on the ground, and, as the greater part of its weight falls on the wheels 2, said wheels revolve carrying with them the disks 24 which in turn vibrate the levers 10 through the medium of the cam-grooves 25 and the posts 27. The vibration of the levers 10 causes the cutters 11 and 12 to reciprocate in opposite directions with a swinging or shearing movement, and to cut the vegetation with which they come in contact. As soon as the wheels 2 cease to revolve of course the cutters 11 and 12 also cease to move.

The shearing movement of the cutters 11, and 12 is due directly to the segmental path traversed by the front ends of the vibrating levers 10.

The front end of the frame side 9 is broken away, in Fig. 2, to show the slot 9$^b$ and the lever 10 passing through the same.

The rolls 28 on the lever posts 27, serve to decrease the friction which would result were said posts to come directly in contact with the sides of the cam-grooves 25, but said rolls may be dispensed with.

What I claim as my invention, and desire to secure by Letters Patent, is—

1. In a lawn mower, the combination with a supporting frame of an axle journaled to said frame having wheels fast to opposite ends thereof, the circumferential cam-grooved disks 24 of less diameter than said wheels rigidly secured thereto, the levers 10 fulcrumed to said frame provided at their rear ends with the posts 27 to engage the cam-grooves in said disks and bifurcated at their front ends, and the reciprocating slotted cutters 11 and 12 operatively connected with the front of said frame and to the bifurcated ends of said levers, substantially as and for the purpose set forth.

2. In a lawn mower, the combination with a supporting frame of an axle journaled to said frame having wheels fast to opposite ends thereof, the circumferential cam-grooved disks 24 of less diameter than said wheels rigidly secured thereto, the levers 10 fulcrumed to said frame provided at their rear ends with the posts 27 to engage the cam-grooves in said disks and bifurcated at their front ends, the reciprocating slotted cutters 11 and 12 operatively connected with the front of said frame and to the bifurcated ends of said levers, the axle 21 carrying the roller 20, and the adjustable bearings 22 to which said axle 21 is journaled, substantially as and for the purpose set forth.

3. In a lawn mower, the combination of the frame A having the standards 4 and 5, an axle journaled to said standards 4 having wheels fast to opposite ends thereof, the circumferential cam-grooved disks 24 rigidly secured to said wheels, the levers 10 fulcrumed to said frame provided at their rear ends with the roll encircled posts 27 to engage the cam-grooves in said disks and bifurcated at their front ends, the reciprocating slotted cutters 11 and 12 operatively connected with the front of said frame and to the bifurcated ends of said levers, the axle 21 carrying the roller 20, the adjustable bearings 22 to which said axle 21 is journaled, and the bows 17 attached to said standards 5 and the handle, substantially as and for the purpose set forth.

In testimony whereof I affix my signature in presence of two witnesses.

WILLIAM TELFER ARMSTRONG.

Witnesses:
  F. A. CUTTER,
  H. S. SPRAGUE.